United States Patent [19]

Yoon

[11] Patent Number: 4,505,258
[45] Date of Patent: Mar. 19, 1985

[54] LIGHT COLLECTING TYPE OF SOLAR ENERGY COLLECTING SYSTEM

[76] Inventor: Yu Taek Yoon, 43-25 (1 Tong 3 Ban), Chusoeng-dong, Yongsan-ku, Seoul, Rep. of Korea

[21] Appl. No.: 439,987

[22] Filed: Nov. 8, 1982

[30] Foreign Application Priority Data

Mar. 16, 1982 [KR] Rep. of Korea .................. 82-7123
Sep. 9, 1982 [KR] Rep. of Korea .................. 82-1983

[51] Int. Cl.³ .................................................. F24J 3/02
[52] U.S. Cl. .................................... 126/424; 126/438; 126/443; 126/448; 126/450; 285/181; 285/124
[58] Field of Search ............. 126/424, 438, 443, 448, 126/450; 285/124, 157, 275, 181; 165/76, 143–145, 150, 173; 138/95; 122/360

[56] References Cited

U.S. PATENT DOCUMENTS

| 3,948,247 | 4/1976 | Heilemann | 126/448 |
| 4,027,653 | 6/1977 | Meckler | 126/443 X |
| 4,228,789 | 10/1980 | Kay | 126/441 X |
| 4,279,242 | 7/1981 | Bogatzki | 126/443 |
| 4,307,712 | 12/1981 | Tracy | 126/443 |

FOREIGN PATENT DOCUMENTS

| 2414696 | 9/1979 | France | 126/443 |
| 65538 | 4/1982 | Japan | 126/443 |
| 2029565 | 3/1980 | United Kingdom | 126/424 |

Primary Examiner—Margaret A. Focarino
Attorney, Agent, or Firm—Cushman, Darby & Cushman

[57] ABSTRACT

The present solar energy collecting system in which a plurality of water heating apparatuses are serially connected to each other by a tube socket and union and is retained securely in the case having a transparent window. Each water heating apparatus comprises a light collecting tube, a concave reflector, a water tube and end caps having an opening. The upper half surface of the light collecting tube is transparent to transmission of the incident solar rays and the remaining lower half surface is a concave reflector to converge the incident solar rays along both sides of the water tube. The water tube is disposed in the light collecting tube enclosed at its ends by the caps. The body portion of the water tube is a configuration of a flat tube to rapidly heat up water and its end portion is a cylinder type of tube to connect rotatably through the opening of the cap to the tube socket. Accordingly, the present system is useful even in a winter season or cloudy days which the sunny time is short since it can obtain more rapidly and continuously a higher degree of hot water and also it is possible to install the system on a ramp such as a roof, or even on the wall since the apparatus can be rotated on the tube socket to face the incident light. In case of installing it on the ramp, the window is a transparent plane window and on the wall, it is a window having zigzag surfaces to face parallel to each concave reflector, respectively.

7 Claims, 5 Drawing Figures

LIGHT COLLECTING TYPE OF SOLAR ENERGY COLLECTING SYSTEM

BACKGROUND OF INVENTION

This invention relates to a solar energy collecting system, particularly an improved light collecting type of solar energy collecting system.

In the prior art, a number of water heating systems for using solar energy have been developed. However, such systems are largely concerned with direct heating types in which a plate having a high coefficient of heat transmission includes a plularity of water tubes exposed directly to the sun rays. However, such systems take too long a time, for example, about 90 minutes, to obtain about 2–3 l of 60° C. water.

Accordingly, to eliminate the shortcomings of the conventional systems, GEM Company in USA had developed U.S. Pat. No. 2,004,200 which is entitled "Parabolic Cup Reflector" and U.S. Pat. No. 4,262,658 which is entitled "Dranable Solar Collector Apparatus" and had recognized officially a superiority of the patents by the Energy Office of U.S. Government and NASA.

However, they have also not completely eliminated such disadvantages of the prior art. As see in FIG. 4, a prior art system consists of a parabolic cup reflector "a" focuses solar energy upon a transparent tube which has a vacuum chamber b formed in its center and a water tube c formed on its external surface. Accordingly, the width "B" of the water tube "c" is wide and, consequently it has the disadvantage of blocking the solar rays which are to be collected for heating action.

Further, the parabolic cup reflector "a" is formed of two concave reflectors so that the overall dimensions thereof are rather large. This prior art apparatus, therefore, does not obtain a maximized light collecting effect, that is, raising the temperature of hot water in a shorter time period in case of cloudy days and the winter season in which available sun time is short.

Furthermore, this prior art system must be installed on a steep ramp, like a roof, so that the space of the structure cannot be used efficiently, a beautiful sight of the structure may be damaged and also it is very difficult to install on a building or upon existing facilities such as apartments.

SUMMARY OF INVENTION

Accordingly, to eliminate above disadvantages an object of the present invention is to provide an improved light collecting type of solar energy collecting system for obtaining higher temperature hot water within a shorter time period even in case of a cloudy days and during the winter season in which sun time is short.

Another object of the invention is to provide an improved system provided with a plurality of serially connected water heating apparatuses which comprises a transparent light collecting tube having a concave reflector on its lower half surface, the ends of the tube covered by caps, and a water tube which has a flat body and a cylinder type of ends and is disposed in the transparent light collecting tube to produce a high heat collecting effect.

Another object of the present invention is to provide an improved system having a construction which can be installed regardless of the angle of slope on the ramp, like a roof, and even permits perpendicular installation on a wall.

Another object of the present invention is to provide an improved system which can be used with a convective way as well as a natural drain way, namely, an up-down stream way.

Other advantages and features of the present invention will become apparent from the following description and the accompanying drawing which are illustrative of a preferred embodiment and the contemplated best mode of the invention herein claimed.

DESCRIPTION OF THE PREFERRED EMBODIMENT

Figure 1:
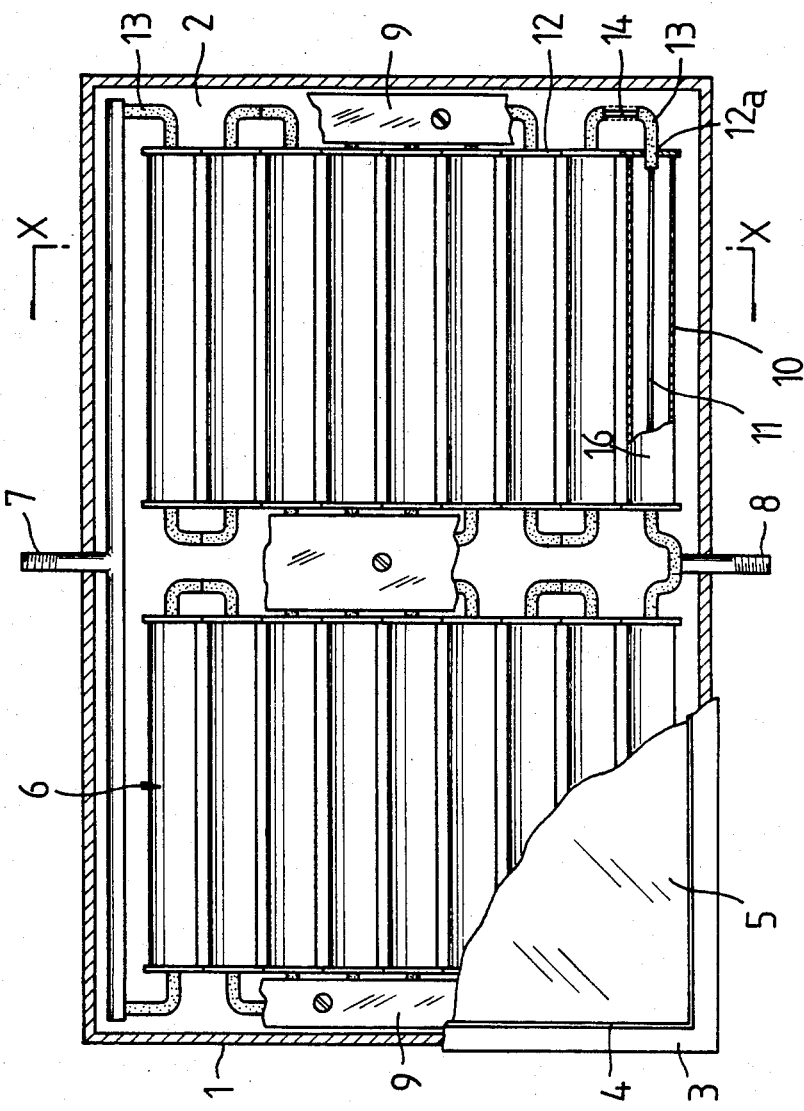
FIG. 1 is a plan view showing the structure of a standard system of the invention, wherein the system is installed on the ramp.

FIG. 1 shows the structure of a preferred system of the present invention installed on a ramp. The improved system of the present invention is arranged in a case 1 which is formed of a material having a low coefficient of heat transmission and is light weight. The bottom and sides inside of case 1 are filled with high quality thermal insulation 2 to keep warm and the case 1 is hermitically covered by frame 3 and packing 4 with transparent window 5 through which solar rays are transmitted onto a plurality of water heating apparatuses 6 as in the prior art. Therefore, in case 1, a high degree of atmosphere is produced in order that the water heating apparatuses 6 can easily make hot water of as high a temperature as possible.

The system of a preferred embodiment of the present invention includes a double symmetric arrangement of apparatuses 6 connected in paralell. Each single arrangement comprises a plurality of the water heating apparatuses 6 which are disposed closely with respect to one other and connected serially on to another as will be explained in detail hereinafter. The arrangement has an inlet pipe 7 for supplying cold water and an outlet pipe 8 for discharging hot water. The arrangements are securely set in the case 1 by support means 9.

In accordance with the solar energy collecting system of the invention, the cold water supplied through inlet pipe 7 by an up-down stream way rapidly heats up in the process of downwardly flowing through a plurality of the water heating apparatuses 6 and is continuously discharged from the outlet pipe 8.

Though double arrangements operating by an up-down stream way have been described above, it is possible to arrange same with only a single arrangement or multiple arrangements to also, operate in a convective way.

Figure 2:
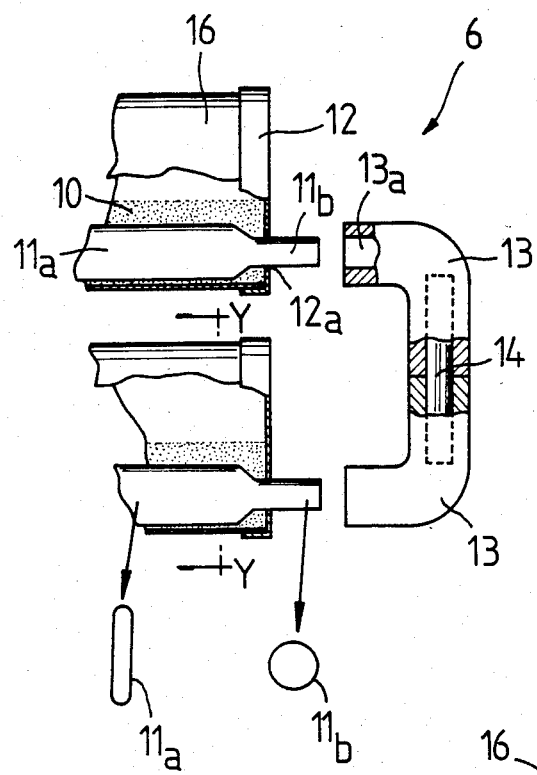
FIG. 2 is a detailed view, partially sectional and disasembled along line X—X in FIG. 1 showing a a manner assembling the system of the present invention.

FIG. 2 shows, in detail, a manner of assembling and a structure of the water heating apparatuses 6. FIG. 2 shows a view partially cut out and partially disassembled along line X—X in FIG. 1 of the water heating apparatus 6. The water heating apparatus 6 consists of light collecting tube 16, a concave reflector 10, a water tube 11 and a cap 12 having an opening 12a for enclosing the ends of tube 16.

The light collecting tube 16 is a cylinder type and includes a concave reflector 10 formed on the lower half of its surface as indicated by dot-shaded area in FIG. 2, the remaining upper half surface of which is transparent to permit transmission the incident solar rays therethrough. The ends of the tube 16 is enclosed by caps 12 to keep the interior environment clean and warm.

The cap 12 has an opening 12a through which the water tube 11 is connected to an opening 13a of the tube socket 13. The tube socket 13 is an "L" type which can be connected by a union 14 with an other tube socket 13 which itself is connected to another tube 16 and is constructed of a resiliant material (eg. rubber) to be hermetically and rotatably connected to the water tube 11.

The water tube 11 is disposed in parallel to the tube 16 at an eccentric position therein so that the incident light rays from the window 5 are converged longitudinally along both sides of the water tube 11 by the concave reflector 10. The water tube 11 is formed of a material having a high coefficient of heat transmission, and its surface is coated with a black color to efficiently absorb the solar heating energy converges therein due to the concave reflector 10. Also, the extended body of the water tube 11 has the configuration of a flat tube 11a while its ends are of a cylindrical configuration of tube 11b to be able to be rotatably connected through the opening 12a of the cap 12 to tube socket 13. Accordingly, the water heating apparatuses 6 constructed as mentioned above can be serially connected one to another by tube socket 13 and union 14 to accomplish the assembly of the system of the present invention.

Figure 3:
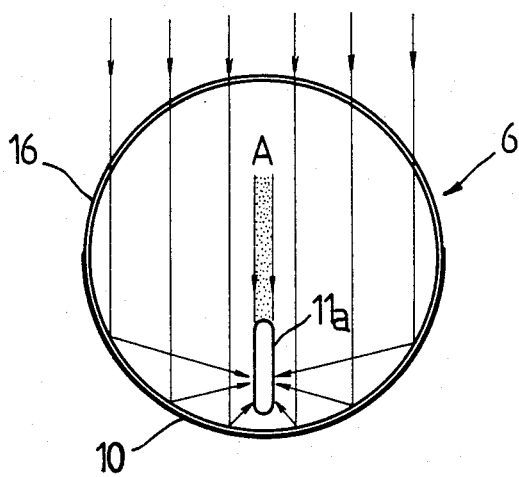
FIG. 3 is a sectional view taken along line Y—Y in FIG. 2 showing the principle of operation of the water heating apparatus of the present invention.
Figure 4:
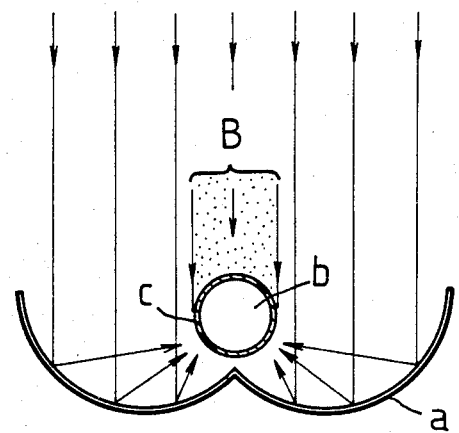
FIG. 4 is a sectional view showing the principle of operation of a prior art water heating apparatus.

FIG. 3 shows the operating principles of the water heating apparatus 6 of the invention, and is a sectional view taken along line Y—Y in FIG. 2. As described hereinbefore, since the water heating apparatus 6 has the enclosed light collecting tube 16 having the concave reflector 10 formed on its lower half surface and the flat water tube 11a is upstanding therein, as indicated by the arrow, all incident light rays through the upper half transparent part of the light collecting tube 16 except those within the width A of the flat tube 11a are converged longitudinally along both sides of flat tube 11 to produce a high temperatures thereat. Therefore, since the enclosed tube 16 is under an atmosphere of high temperature and the flat tube 11a has a small width "A", the incident light rays can be used to the maximum efficiency and the converged solar energy to a greater degree can heat an amount of water at a higher temperature and more highly in than compared to the prior art device of FIG. 4.

Figure 5:
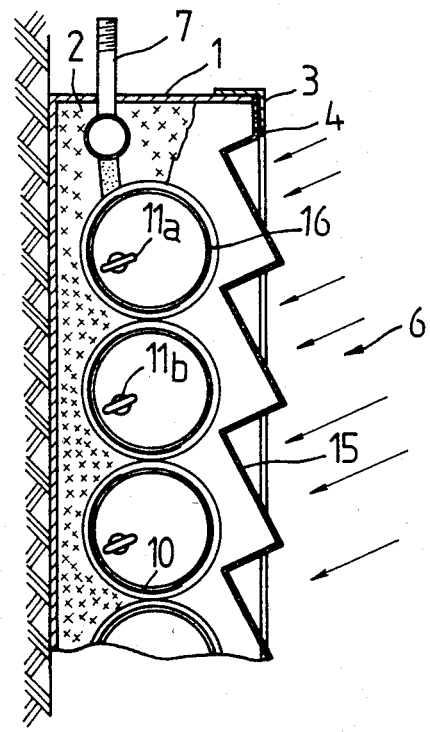
FIG. 5 is a side elevation view showing the disposition state of the solar energy collecting system of the present invention, wherein the system is installed on a wall.

FIG. 5 shows an application of the improved system of the present invention and is a side elevational view of an improved system which can be installed perpendicularly on a wall. Typically, it is most important that the reflector must always be disposed to face the incident direction of the solar rays at the proper angle in order to obtain maximum efficiency. Accordingly, in the system of the present invention, it is noted that it is possible to install the system regardless of the angle of slope, even on the planar surface or on a wall since the water heating apparatus 6 is rotatably connected to the tube socket 13. Thus, during assembly it, can be easily rotated to face the incident direction of the solar rays at the proper angle. Furthermore, in the case of installing the system perpendicularly on a wall, as shown in FIG. 5, the water heating apparatus 6 is rotated to face the direction of incident rays. It is also preferable that the window 15 face the direction of the incident solar rays since the present inventor knows through experiment the fact that if the window 15 is a planar window 5 as in FIG. 1, there is a tendency that a portion of the incident solar rays is reflected against the window. Accordingly, the window 15 has a general configuration of saw teeth, namely, zigzag surfaces which are parallel to each respective concave reflectors.

It is also noted that the improved system of the invention can also be be installed regardless of the angle of the slope of the ramp in a similar manner. In accordance with an improved system of the invention as mentioned above, it is noted that under the same condition as in the prior art, 25° C. of cold water supplied to the inlet pipe 7 is heated to about 60°–80° C. of hot water in the process flowing downwardly through the water heating apparatuses from inlet pipe 7 to outlet pipe 8 and is discharged continuously from outlet pipe 8. Thus, a greater amount of hot water, e.g. about 25–30 l/per hour, can be discharged as compared to systems of the prior art. It is also noted that even in the winter season or on cloudy days which sun time is short, the present system is very useful since hot water can be obtained rapidly and continuously.

Furthermore, in accordance with the present invention, it is noted that it is possible to use it in a convective way as well as a downstream way.

The above described system is merely illustrative of the principles of the present invention and numerous modifications and adaptations thereof will be readily apparent to those skilled in the art without departing from the spirit and scope of the present invention.

What is claimed is:

1. A solar energy collecting system comprising:
   a case defining an inner cavity and including a transparent window for permitting incident solar rays to pass therethrough,
   an inlet pipe for supplying cold water,
   an outlet pipe for discharging hot water,
   a plurality of water heating elements disposed in said inner cavity of said case to receive incident solar rays which pass through said transparent window, each said element including an outer transparent cylindrical tube, and a water tube defining an interior space through which water passes, said outer tube and said inner tube defining therebetween a vacuum chamber, wherein
   said plurality of water heating elements are serially connected to one another between said inlet pipe and said outlet pipe by means of an L-type of tube socket and a union, said outer tube being enclosed at both ends by caps having an opening eccentrically defined relative said cylindrical outer tube, said outer tube further including concave reflector means formed on one half the inner surface of said outer tube to convergingly reflect said incident solar rays, said water tube defining an opposing pair of parallel planar side surfaces, between cross-sectionally circular opposing ends, said opposing ends mounted in said openings so that said water tube is eccentrically disposed relative said outer tube; and means mounting said outer and inner tube with respect to each other to permit parallel alignment of said side surfaces with respect to said incident solar rays, said rays converging upon said side surfaces by virtue of said reflector means to elevate the temperature of the water flowing through said water tube, and wherein said transparent window has the configuration of zigzag surfaces, said concave reflectors and said zigzag surfaces each capable of facing the incident solar rays when said system is installed perpendicularly on a wall.

2. The system of claim 1 wherein said water heating elements include means for rotatably connecting said elements to said L-type of tube sockets to permit said outer tube and said water tube to be rotatable into the incident direction of solar rays at the proper angle so as to permit said reflector means to converge said incident rays onto said planar side surfaces of said water tube.

3. The system of claim 2 wherein that portion of said outer tube opposing said reflector means is transparent to permit the incident solar rays to be transmitted therethrough upon said reflector means.

4. The system of claim 3 wherein said water tube is upstandingly positioned relative to said concave reflector means of said light collecting tube to longitudinally converge the incident solar rays onto both sides of said flat tube.

5. A system as in claim 1 wherein said water tube is formed of a material having a high coefficient of heat transmission.

6. A system as in claim 5 wherein said water tube is coated with a black-colored material to efficiently absorb solar energy.

7. A system for collecting solar energy of the type which elevates the temperature of a working fluid circulating therethrough by virtue of incident solar rays, said system comprising:

a case defining an inner cavity and including a transparent window having the configuration of zigzag surfaces which are capable of facing the incident solar rays at the proper angle for permitting the incident solar rays to pass therethrough;

serially interconnected plural heating elements each disposed in said inner cavity and each comprising an elongated cylindrical transparent tube, concave reflecting means disposed on one half of said tube for convergingly reflecting solar rays incident thereon, and working fluid tube having a body defining an interior space through which said working fluid circulates and also defining opposing planar sides, said body eccentrically disposed in the interior of said cylindrical tube relative to said reflecting means, said planar sides each receiving solar rays which have been convergingly reflected by said reflecting means to enhance the temperature elevation of said working fluid circulating through said working fluid tube;

working fluid inlet means in fluid communication with a first one of said fluid tubes of said plural heating elements for introducing cold working fluid thereto;

working fluid discharge means for communication with a last one of said fluid tubes of said plural heating elements for discharging working fluid at an elevated temperature therefrom; and mounting means for serially mounting said plural elements one to another to establish a series flow arrangement of said working fluid through said working fluid tubes and for rotatably connecting individual ones of said plural elements to permit said individual ones to be rotatably positioned, each said reflecting means and said planar sides of each said working fluid tube of respective ones of said plural elements thereby being together positionable to align said planar sides parallel relative said incident solar rays which pass through said transparent window to achieve maximum converging reflection thereof upon said planar sides of said working fluid tubes by virtue of said reflecting means.

* * * * *